May 3, 1966     O. L. WATSON     3,249,226
METHOD OF AND APPARATUS FOR HEAVY MEDIA SEPARATION
Filed Oct. 5, 1961     2 Sheets-Sheet 1

INVENTOR.
ORRIS L. WATSON
BY
ATTORNEYS

May 3, 1966   O. L. WATSON   3,249,226
METHOD OF AND APPARATUS FOR HEAVY MEDIA SEPARATION
Filed Oct. 5, 1961   2 Sheets-Sheet 2
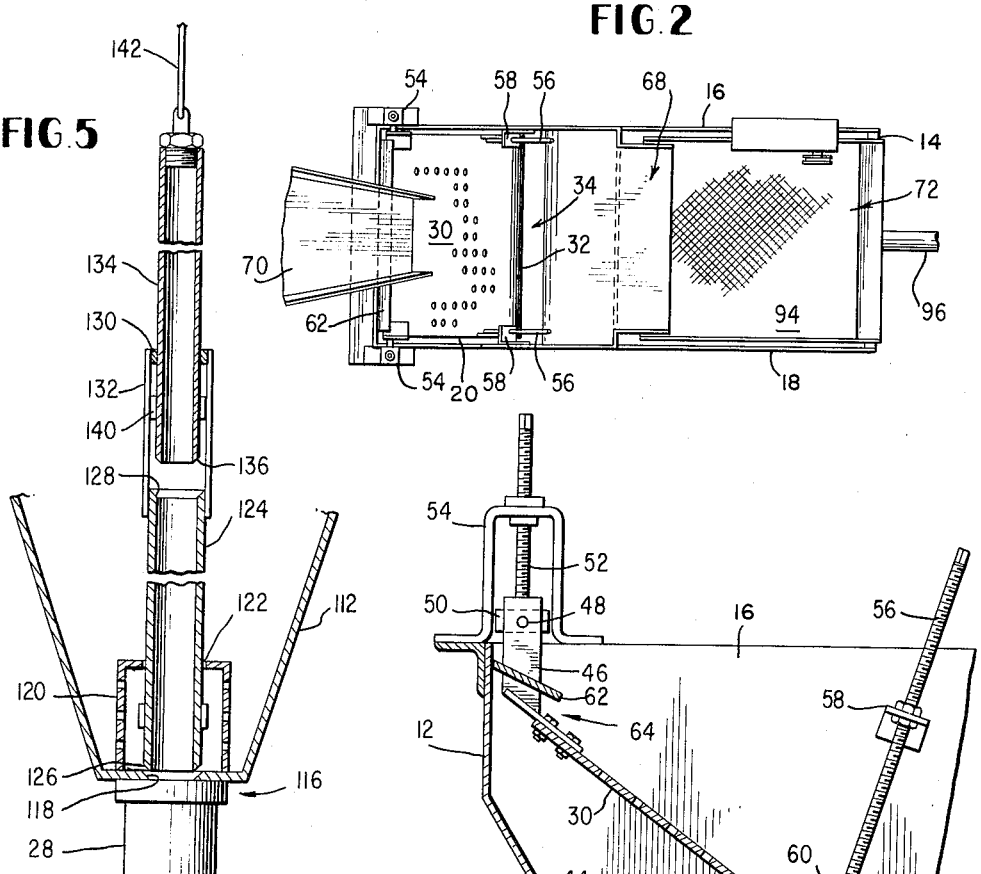
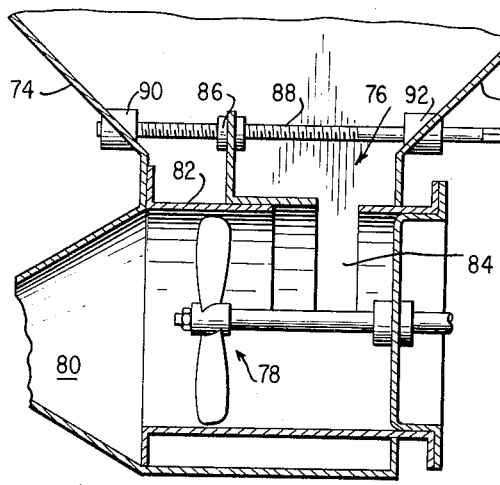
INVENTOR.
ORRIS L. WATSON
BY
ATTORNEYS

United States Patent Office 3,249,226
Patented May 3, 1966

3,249,226
METHOD OF AND APPARATUS FOR HEAVY MEDIA SEPARATION
Orris L. Watson, 1709 Massey Circle, South Charleston, W. Va.
Filed Oct. 5, 1961, Ser. No. 143,162
9 Claims. (Cl. 209—172.5)

This invention relates generally to separation and classification and more particularly and specifically to methods and apparatus for separation of selected materials of different specific gravities.

Generally, the present invention is concerned with novel methods and apparatus for separation, by way of example, of lightweight aggregates from unburned slag impurities. For example, the residue from mine refuse burned in a kiln would produce reclaimable aggregates and heavier stone impurities which, together would form a raw feed material to which the process and apparatus herein disclosed would be applicable.

The principal object of the present invention resides in the provision of unique and useful improvements in methods and apparatus for separation and classification of materials which utilize novel steps, procedures and components to obtain advantageous and improved results over prior art methods and apparatus.

A principal object of the present invention lies in the utilization of a unique method and apparatus for continuous collection and rejection of impurities during separation which avoid the heretofore common use of expensive and space-demanding elevators and like mechanical discharge and rejecting equipment.

Another important object of this invention is the provision of novel method steps and apparatus for the maintenance of a slurry reserve of constant volume, density and availability assuring a balanced separation system operating at maximum efficiency.

Still another object of this invention resides in the provision of novel method and apparatus improvements to the prior art which function to provide for a continuous, automatic operation of a highly effective and efficient separation of materials of different specific gravities.

A further object of this invention is the provision of a separating method, and apparatus for practice thereof, which utiilzes a wash or flotation slurry consisting of a water suspension of dust particulates carried into the system as natural content of the raw material feed entering the system for classification and separation treatment, or a wash or floation slurry of specified composition made up and delivered to the system.

Still further objects and advantages of this invention will become more readily apparent to those skilled in the art when the following general statement and description are read in the light of the accompanying drawings.

The nature of the present invention may be described in general terms as relating to a method for separation of selected materials of different specific gravities which includes the introduction of raw material into a moving liquid bath, discharging light particulates and bath liquid at an elevated point in said bath, collecting and discharging the light particulates and reclaiming the bath liquid, reintroducing the bath liquid as an up-flowing current in said moving liquid bath, collecting heavy sinkable materials in a liquid reject system at a point below said bath, pumping said reject liquid and heavy sinkable materials to an elevated point, discharging said heavy sinkables at the elevated point while collecting the reject liquid, recirculating said reject liquid beneath the bath; and to novel apparatus so arranged as to perform the aforedescribed step by step procedure.

Referring now to the accompanying drawings in which like numerals indicate similar parts throughout the several views:

FIG. 2 is a top plan view of the tank and recovery vessel as indicated by line 2—2, FIG. 1;

FIG. 3 is an enlarged vertical section illustrating the hinged baffle connection and nozzle plate;

FIG. 4 is an enlarged fragmentary vertical section of the adjustable inlet to the recirculating impeller;

FIG. 5 is a fragmentary vertical section of the storage sump dump valve.

Figure 1:
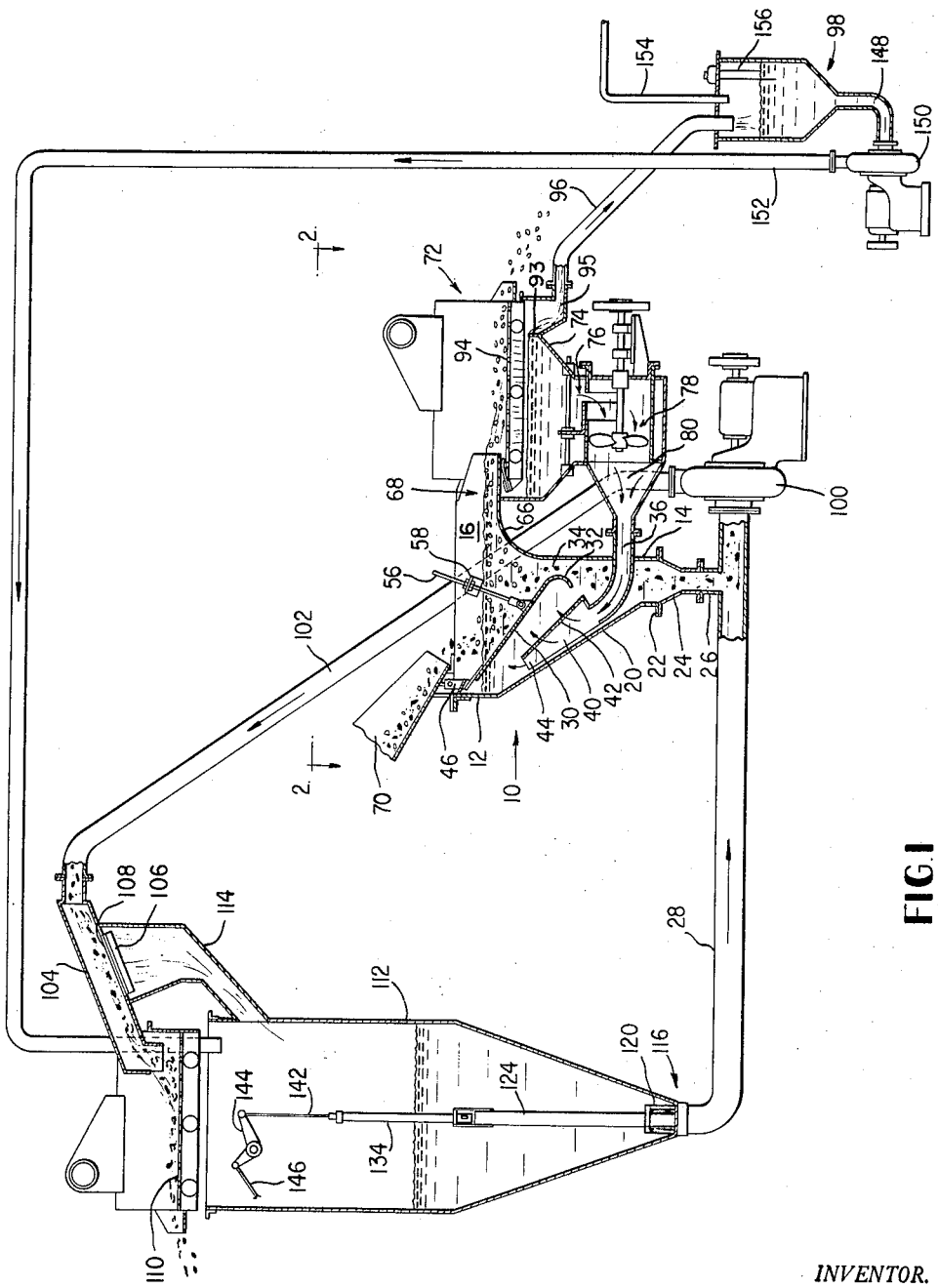
FIG. 1 is a side elevation in vertical section illustrating in schematic detail the apparatus constituting a part of the present invention.

The apparatus forming a part of my present invention consists generally of four units operating in cooperative relationship and including a flotation or washing unit, a reject unit, a slurry recovery and circulating unit, and a slurry recovery and recirculating unit. The flotation or washing unit consists, essentially, of apparatus substantially like that disclosed in United States Letters Patent No. 2,151,007, issued March 21, 1939, to Joel R. Belknap, and this apparatus operates, to the extent that it is similar to this prior disclosure, on essentially the same principles as the prior art apparatus. For reasons of economy, however, it is anticipated that the present invention, in most adaptations, will employ flue dust, silica dust, magnetite, or the like, as a suspension medium as opposed to the $CaCl_2$ compositions suggested in the Belknap patent.

Basically, my flotation or wash unit, generally designated at 10, consists of a tank 12 having three vertical walls 14, 16 and 18, and an upwardly and outwardly inclined wall 20, all joined to form a wide top mouth and restricted bottom portion. The bottom end is open and is coupled, as at 22, to the upper open end of a funnel-shaped transition piece 24 depending therebeneath and having its lower end, in turn, coupled to a fitting 26 on a fluid line 28, to be hereinafter described.

The tank 12 is provided with a perforated baffle plate 30 projecting from a hinged attachment, to be hereinafter described, from adjacent the upper end of the inclined wall 20 of the tank downwardly and transversely of the tank to terminate in an under-curled end 32 at a spaced distance from the opposite vertical wall 14 of the tank and defining therewith an orifice or throat 34 communicating between the upper and lower portions of the tank as defined by the transverse baffle plate 30.

An inlet pipe 36 communicating with a liquid source, as hereinafter described, enters the tank perpendicularly through the vertical wall 14 at a spaced distance below the throat 34 and extends transversely and upwardly of the tank to terminate in a connection with a diffuser-nozzle cage 40 adjacent the opposite inclined wall of the tank below the baffle plate 30. The cage 40 is characterized by a wall 42, which may be perforated, spaced from the inclined wall 20 of the tank and positioned with the upper end thereof converging toward the inclined wall and terminating in spaced relationship thereto to define therewith a restricted nozzle outlet 44 directed upwardly along the inclined wall generally beneath the hinged attachment of the baffle plate 30 to the upper end of the inclined wall.

The attachment of the baffle plate 30 within the tank is accomplished by a pair of hinge plates 46 which are secured vertically to the opposed side edges of the upper end of the baffle plate to project above the tank where each is pivotally secured, as at 48, to a jack-nut or collar 50 engaged on a vertical jack-screw 52 rotatably mounted in a bridge channel member 54 supported on the upper edge of the tank.

A pair of elongated jack-screws 56 each acting through a fixed nut 58 on one side wall of the tank perpendicular to the inclined wall thereof and having rotating attachment, as at 60, with the baffle plate 30 at a point intermediate its length, provides for vertical adjustment of the projected end of the hinged baffle plate and permits adjustment of the angularity of baffle 30 in the tank.

The size of the throat 34 is adjusted by the telescopic arrangement between baffle 30 and hinge plates 46 to which the baffle plate is secured by bolts operating in elongated slots (not shown). Such telescopic arrangement permits adjustment of the baffle plate toward and away from tank wall 14.

A generally rectangular nozzle plate 62 is fixed to the inclined wall of the tank in angular relationship thereto at a point above the upper hinged end of the baffle plate 30. The upper end of baffle plate 30, between the hinge plates 46, is cut away below the nozzle plate 62 to provide with the nozzle plate an orifice or throat 64 opening above the baffle plate and in communication with the general area of the tank adjacent the inclined wall along which the restricted nozzle outlet 44 of cage 40 is directed. The opening of the orifice or throat 64 is adjusted by raising and lowering the baffle hinge plates through the medium of jack-screws 52 moving the baffle toward or away from the nozzle plate.

The upper end of the vertical wall 14 is turned over and outwardly as at 66 to provide a substantially horizontally projected overflow trough 68 having a predetermined depth below the top edge of the tank, and a raw material feed hopper 70 is located immediately above the nozzle plate 62 opposite said overflow.

Associated with and functioning cooperatively with the wash or flotation tank is a slurry recovery and circulating vessel 72 which has an open top immediately below and with an edge thereof underlying the overflow trough 68 of tank 12. The side walls 74 of the vessel 72 incline inwardly intermediate their vertical length to converge on a valved opening 76 into the suction side of an impeller pump 78 mounted in the lower region of the vessel and directed toward a converging outlet fitting 80 which is connected to the inlet line 36 communicating with the lower region of tank 12.

The valved opening 76 on the suction side of impeller pump 78 consists of a baffle or wall 82 extending transversely of vessel 72 between and joining the converging walls 74. The wall 82 is provided with the inlet throat 76 formed by a telescopic section of wall 82 which is movable into and out of the open throat. The telescopic section of wall 82 is secured to and supported by a threaded collar 86 engaged on a horizontal screw 88 which is journalled at one end within the tank against one side wall, as at 90, with the second end projecting through and journalled in the opposed wall of the tank as at 92. The projected end of the screw is engageable by a wrench or like tool for rotation of the screw to move the telescopid wall for purposes of increasing or restricting the throat 76.

The vessel 72 is equipped transversely of the upper open end thereof with a conventional, motor operated vibrating dewatering screen 94 which has one end originating beneath the outlet end of overflow trough 68 and the second end projecting beyond the opposite of the vessel to terminate above a discharge receiver (not shown). The vessel 72 is also provided at a point beneath the level of the dewatering screen with an overflow weir 93 and trough 95 the discharge end of which is coupled to a conduit 96 which empties by gravity into a sump 98 to be hereinafter described.

The reject unit of my apparatus consists of a pump 100 having its suction side coupled to fluid line 28 closely adjacent the fitting 26 therein which is connected to the transition piece located on the lower end of the flotation or wash tank 12. The discharge side of pump 100 has connection to a conduit 102 which is carried upwardly to an elevated position where it is connected to a chute hopper 104 having a fixed dewatering screen 106 in a bottom opening 108 therein. The discharge end of the hopper chute 104 is located above a second vibratory dewatering screen 110 which is mounted above the open end of a large vertical sump tank 112. The bottom opening 108 in the chute 104 communicates through the fixed screen with a conduit 114 which also opens into the upper end of the large vertical sump 112.

The vertical sump 112 extends in elevation above the top level of the wash or flotation tank 12 and is provided with a bottom discharge opening 116 coupled to one end of fluid line 28 remote to the suction side of pump 100 and on the opposite side of fitting 26 therefrom. The bottom discharge opening 116 in sump 112 is provided with an inwardly disposed tapered seat 118 about and above which is provided a vertical guide 120 having a circular opening 122 in its upper end for the telescopic reception of an elongated hollow cylinder 124 having a tapered lower end 126 engageable with the tapered seat 118. Hollow cylinder 124 is provided with a tapered seat 128 about its upper open end and with a collar 130 supported in coaxial projection beyond the upper end thereof by longitudinally projecting radially spaced fingers 132.

A second hollow cylinder 134, of smaller diameter than cylinder 124 and having an open tapered bottom end 136, is positioned coaxially above cylinder 124 with its tapered bottom end seated on seat 128 on the upper end of the lower, larger cylinder. The smaller cylinder is provided at a spaced distance above its lower end with collar blocks 140 radially spaced thereabout and lying intermediate the projecting fingers 132 on the larger cylinder 124.

The upper end of smaller cylinder 134 is closed, and a vertical lift rod 142 projects therefrom to a point of attachment to one arm of a bellcrank 144 operably connected in turn to a valve operating lever or link 146.

The slurry recirculating unit associated with the flotation or washer and with the refuse reject system consists of the sump 98, earlier designated, which is positioned below the overflow 95 of vessel 72 to receive the gravity overflow from the vessel. Sump 98 is provided with a bottom discharge 148 having connection with the suction side of a recirculating impeller pump 150, the discharge side of which is connected by an elongated conduit 152 into a fitting fixed above the open top end of the large elevated sump 112 into which it discharges. The sump 98 has communication through a valve inlet 154 with a source of make-up (not shown) with an electrical level detector 156 controlling actuation of the make-up feed valve to maintain a controlled level in the sump 98.

To initiate first operation of the apparatus, slurry of proper density is usually built up in wash tank 12 by the addition of liquid and solids thereto which are pumped to the elevated sump container 112 until the volume of slurry in the elevated sump reaches a point where, seeking its own level, it will flow through conduit 28 into the tank and overflow recovery vessel 72 filling these receptacles to the point of overflow of vessel 72. Then, initiation of circulator 78 will induce an increase in water level in bath 12 to a point where it will overflow through trough 68. When liquid overflows tank 72, at weir 93, the liquid system will have reached a point of balance. Thereafter an additional quantity of liquid will be supplied to the elevated sump to produce a differential head pressure between the elevated sump and the tank and recovery vessel to insure a flow of predetermined volume through conduit 28 past the discharge outlet 26 in the bottom of the tank. The head pressure in elevated sump 112 bears such a relationship to the head pressure in tank 12 that a condition of substantially static liquid communication is created at the juncture of conduit 28 and tank outlet 26. This substantially static condition is sufficiently unbalanced by a differential in head pressures between tank 12 and sump 112 to provide for a slight flow from conduit 28 upwardly into outlet 26 to such a degree as to preclude any liquid flow from the tank outlet to the suction side of pump 100, and to cause a limited degree of intermixing of the suspended particles in the two liquid systems to maintain the desired density of the wash bath liquid, but, also, such upflow is sufficiently negligible so as not to obstruct gravitational sinking of heavy materials from tank outlet 26 in to conduit 28.

Such a balance of liquid pressures and flows enables substantial separation of the two liquid systems, namely, the wash liquid and the reject liquid, while permitting them to be in open contact one with the other to permit the intermixing of suspension particles as referenced.

At the same time that the head pressure is created in the elevated sump, raw material is fed to the tank from the feed hopper 70 and the liquid injection throat 64 is activated to create a surface current in the tank in the direction of the tank overflow trough 68. The raw materials fed to the tank which are heavier than the effective operating density of the liquid slurry in the tank will gravitate downwardly through the restricted throat 34 into the transition piece 24 and thence outwardly of the outlet 26 into conduit 28 to the suction side of the reject pump 100. The reject pump 100 will transport the heavy settling materials and reject liquid from line 28 upwardly to the elevated position above the elevated sump 112 where the liquid will be recovered and discharged into the sump and the heavy granular materials collected on the dewatering screen 110 and discharged to a collection point.

Simultaneously, the materials fed in the raw feed to the tank which are lighter than the effective density of the liquid slurry will be impelled in the surface current across the tank and discharged with liquid from the tank overflow trough 68 onto the dewatering screen 94 above the recovery vessel. At the same time, liquid rising through the perforations in baffle 30 and through orifice 34 will implement stratifying of lighter particles in the liquid in the upper portion of the tank tending to hold them in the surface current moving toward overflow 68. The liquid discharged from trough 68 will be collected in the recovery vessel and the lighter granular materials will be discharged from the moving dewatering screen into a collector. The operation of the tank, the recovery vessel and the refuse reject components will continue in balance so long as the conditions heretofore described are maintained.

In the operation of the apparatus described, the coarser of the fine particles suspended in the tank bath liquid and contributing to the determination and maintenance of its preselected density would normally tend to settle in the tank and be discharged with the heavy granular rejects through outlet 26. Thus, normal passage of time would bring about a decrease in the effective density of wash liquid in the tank with a simultaneous increase in the density of the liquid in the pumping circuit. However, in the presently described novel apparatus the provision for circulation of the wash bath liquid from the recovery vessel back to a lower portion of the tank as well as recirculation of the liquid overflow from the recovery vessel will cause a constant remixing of the liquid within the system and a constant uprising stream within the tank causing further mixing of the liquid whereby a constant static density of slurry liquid is maintained throughout the entire system.

It is important to recognize that the recirculating sump assures maintenance of an excess of liquid in the system at all times compensating for liquid lost at both points of granular material discharge, and through splashage, evaporation and other causes. Further, all variations in liquid level in the system will occur in the slurry liquid recirculating sump whereby the levels within the washer, recovery vessel and elevated sump will be constantly maintained and the operating system will remain in balance at all times. Appropriate controls are utilized in the recirculating sump to provide for make-up feed to the system at this point as it is needed, and density testing will permit periodic addition of solids to the recirculating sump to maintain a constant static density of slurry liquid throughout the system.

When it is desired to shut down operation of the system herein disclosed; (1) the automatic liquid level controls are de-activated, (2) the elevated sump dump valves are closed, (3) the dewatering screen above the recovery vessel is stopped, (4) the wash liquid circulator in the recovery vessel is shut off, (5) the reject pump and slurry recirculating sumps are permitted to operate until the liquid in the system has all been pumped into the elevated sump, after which these pumps are shut off, and (6) the dewatering screen above the elevated sump is stopped.

To resume operation of the system after a period of shut-down; (1) the reject pump is started, (2) the dewatering screen above the elevated sump is activated, (3) the top section of the dump valve in the elevated sump is opened permitting partial filling of the wash tank and recovery vessel, and liquid circulation by the reject pump, (4) after a delay, the bottom section of the sump dump valve is opened further filling the system to a point of substantial balance, (5) the circulation and recirculation pumps are activated as is the dewatering screen above the recovery vessel, and (6) the liquid level controls are activated permitting the system to attain absolute balance and operational condition.

From the foregoing it is seen that an open liquid circulating system is provided in conjunction with a separating unit wherein the volume and density of slurry bath is constantly and automatically maintained at a predetermined level so as to provide the most effective and efficient separation of light and heavy materials introduced into the separating unit. It is also seen that simple pump-type refuse discharge is provided in replacement of the usual costly and space-demanding mechanical elevators which have been heretofore used for the removal of heavy materials from typical flotation separation equipment.

The methods and apparatus hereinbefore described are particularly and advantageously adaptable to separations generally characterized as light medium flotation separations. However, it is recognized that the apparatus and methods described may be employed in heavy or dense medium separation methods with little or no modification of the methods and apparatus being required.

For example, the apparatus described could be modified by the removal of the baffle plate 30, with an extension of the nozzle cage 40 along the adjacent tank wall to a point below nozzle plate 62. Cage 40 would necessarily have solid side walls rather than perforated as described.

By the foregoing modification all liquid circulated from the recovery vessel 72 to tank 12 will be directed as a horizontal flow stream across the bath surface, with only sufficient uprising current from the discharge outlet 26, as referenced, to maintain a continuous intermix of particulates serving to establish the bath liquid density.

Having fully described the methods and apparatus constituting the present invention and satisfying all of the advantages heretofore attributed thereto, what I desire to claim is:

1. Apparatus for separation of granular solids of different specific gravities comprising, in combination: a tank containing a liquid suspension of selected density, feed delivery means adjacent one edge of said tank, solid and liquid overflow means from said tank opposite said feed delivery, a slurry recovery vessel receiving fluent from said tank overflow, means circulating fluent from said recovery vessel to the lower portion of said tank, heavy solids discharge outlet means in the bottom of said tank; a solids reject pump drawing from the tank bottom outlet and delivering to an elevated solids collector, an elevated liquid recovery container beneath and receiving liquid from the elevated solids collector, said recovery container continuously confining liquid to a level above the level of the liquid suspension in said tank, and a valved outlet beneath the elevated recovery container communicating with the heavy solids bottom outlet means of said tank and said solids reject pump subjecting all heavy solids discharge to a substantially static liquid pressure balance under the head of said elevated recovery vessel; a liquid make-up and recirculating sump below the tank overflow recovery vessel and communicating therewith, and a pump discharge from said recirculating sump to the elevated liquid recovery container.

2. Apparatus for separation of mixed granular solids of different specific gravities comprising, in combination: a flotation tank including a light granule overflow weir with liquid recirculation means therefrom to the tank, and heavy granular discharge outlet means in the tank bottom; a heavy granule discharge liquid system including liquid conduit means in communication with the tank bottom heavy granule discharge outlet means, a pump in said conduit discharging to an elevated granule collector, and an elevated liquid collector confining liquid to a level above the top of said tank associated with said granule collector and having a gravity outlet communicating with said conduit subjecting all the heavy granule discharge from said tank to a substantially static liquid pressure balance under the head of said elevated liquid collector.

3. A combination of apparatus as defined in claim 2 including means supplying a source of make-up liquid in communication with said elevated liquid container.

4. A method for separating mixtures of granular solids of different specific gravities consisting of introducing the mixture into a liquid bath of selected density, overflowing a portion of said bath, recovering light solids from said overflow, circulating bath overflow as an ascending current in said bath stratifying light granular solids, discharging all heavy granular solids by gravity into a continuously circulating liquid system, pumping said heavy solids in liquid to an elevated collector and retaining the liquid in the circulating system to create a substantially static liquid pressure balance in the area of heavy granular solids gravity discharge from said bath.

5. A method for separating mixtures of granular solids of different specific gravities consisting of introducing the mixture into a liquid bath of selected density, overflowing a portion of said bath, recovering light solids from said overflow, circulating bath overflow as an ascending current in said bath stratifying light granular solids, discharging all heavy granular solids by gravity from said bath directly into a communicating liquid circulating conduit, pumping said heavy solids and circulating liquid to an elevated separation and collection point, returning said separated liquid by gravity head to said liquid conduit at a point therein in advance of the granular discharge thereinto creating a substantially static liquid pressure balance in the area of heavy granular solids gravity discharge from said bath.

6. A method for separating mixtures of granular solids of different specific gravities consisting of introducing the mixture into a liquid bath of selected density and having a surface current moving toward an overflow, collecting light solids and liquid below said bath overflow and separating them, returning said overflow liquid under pressure as an uprising current in said bath, discharging by gravity all heavy settling solids from a bottom bath outlet and pumping them in circulating liquid to an elevated position above said bath, separating the liquid and heavy solids, collecting said last-named liquid in a container elevated above said bath, releasing said elevated liquid to communicate with the bottom heavy solids discharge outlet from said bath under head pressure creating a substantially static liquid pressure balance in said bath outlet through which all heavy solids discharge from the bath, and adding make-up liquid to said elevated container as needed to maintain a predetermined head therein.

7. A method for separating mixtures of granular solids of different specific gravities which consists of the steps of introducing the mixture onto the surface of a liquid bath of selected density and having a surface current moving toward a bath overflow, collecting liquid and light granular solids in the bath overflow, circulating the bath overflow liquid as an uprising stream in said bath, discharging all heavy solids by gravity from beneath said bath, and sealing said heavy solids discharge against bath liquid loss with a communicating circulation liquid system creating a substantially static liquid head pressure in the area of gravity discharge of heavy solids.

8. Apparatus for separating mixtures of granular solids characterized by different specific gravities, including a tank containing a liquid of selected density, a hopper at one side of said tank for feeding granular solids of mixed specific gravities to the tank, an overflow trough on said tank opposite said hopper, a foraminous solids collector beneath said tank overflow, a liquid recovery vessel beneath said foraminous collector, a circulation conduit from said recovery vessel to the lower region of said tank, impeller means including liquid travel in said conduit to said tank, heavy solids discharge means in the bottom of said tank, pump means pumping discharged heavy solids from said tank bottom discharge means to an elevated foraminous solids collector, an elevated liquid container beneath said elevated solids collector, said container continuously confining liquid to a level above the level of liquid in said tank, a liquid conduit from said elevated container communicating with said heavy solids discharge means of the tank and with said pump means for subjecting all heavy solids discharge from said tank to a counter-directional liquid flow sufficient to create a substantially static liquid balance in said outlet means under pressure of the head of said elevated liquid container, and means supplying a source of make-up liquid communicating with said elevated container.

9. Apparatus for separation of granular solids of different specific gravities comprising, in combination; a tank containing a liquid of selected density, feed delivery means adjacent one edge of said tank, solid and liquid overflow means from said tank opposite said feed delivery, a liquid-solids separator associated with said overflow means and receiving the tank overflow therein, a liquid recovery vessel disposed beneath and receiving by gravity liquid from said tank overflow separator, means circulating liquid from said recovery vessel to the lower portion of said tank, and heavy solids discharge means in the bottom of said tank; a heavy solids reject pump communicating with the heavy solids discharge means and delivering to an elevated solids collector, and an elevated liquid recovery container beneath and receiving liquid from the elevated solids collector, said container continuously confining liquid to a level above the level of the liquid in said tank, and said container having a bottom discharge communicating with the heavy solids discharge means from said tank and with the solids reject pump subjecting all heavy solids discharging from said tank to a substantially static liquid pressure under the head of said elevated liquid recovery vessel.

References Cited by the Examiner

UNITED STATES PATENTS

| | | | |
|---|---|---|---|
| 2,151,007 | 3/1939 | Belknap | 209—173 |
| 2,533,074 | 12/1950 | Weinig | 209—159 |
| 2,775,346 | 12/1956 | Tromp | 209—172.5 |
| 2,821,303 | 1/1958 | Davis | 209—172.5 |
| 2,833,411 | 5/1958 | Bosman | 209—172.5 |
| 2,964,179 | 12/1960 | Loevenstein | 209—158 |

FOREIGN PATENTS 541,396  3/1956  Belgium.

FRANK W. LUTTER, *Primary Examiner.*

HARRY B. THORNTON, HERBERT L. MARTIN, ROBERT A. O'LEARY, *Examiners.*